(12) United States Patent
Grabher

(10) Patent No.: US 11,530,075 B2
(45) Date of Patent: Dec. 20, 2022

(54) STACKABLE BOX

(71) Applicant: FRIES Planungs- und Marketinggesellschaft m.b.H., Sulz (AT)

(72) Inventor: Markus Grabher, Lustenau (AT)

(73) Assignee: Fries Planungs—und Marketinggesellschaft m.b.H., Sulz (AT)

(*) Notice: Subject to any disclaimer, the term of this patent is extended or adjusted under 35 U.S.C. 154(b) by 85 days.

(21) Appl. No.: 16/575,771

(22) Filed: Sep. 19, 2019

(65) Prior Publication Data

US 2020/0087029 A1 Mar. 19, 2020

(30) Foreign Application Priority Data

Sep. 19, 2018 (AT) .................................. 291/2018

(51) Int. Cl.
  *B65D 21/02* (2006.01)
  *B65G 59/02* (2006.01)

(52) U.S. Cl.
  CPC ........ *B65D 21/0215* (2013.01); *B65G 59/023* (2013.01)

(58) Field of Classification Search
  CPC .... B65D 21/0215; B65D 21/00; B65D 21/02; B65D 21/0209; B65D 21/0211;
  (Continued)

(56) References Cited

U.S. PATENT DOCUMENTS 3,998,328 A * 12/1976 Box ...................... B65D 1/243
                                                    220/519
4,014,458 A *  3/1977 Berges ............... B65D 21/0215
                                                    220/826
(Continued)

FOREIGN PATENT DOCUMENTS

CN      101484371      7/2009
CN      102574604      7/2012
(Continued)

OTHER PUBLICATIONS

"Kit Greifer" from Google, https://www.google.com/search?q=kit+griefer&client=firfox-b-ab&source=lnms&btm=isch&s, 1 page, downloaded Sep. 4, 2018.
(Continued)

*Primary Examiner* — Robert Poon
(74) *Attorney, Agent, or Firm* — Volpe Koenig

(57) ABSTRACT

A stackable box (1) for accommodating and for transporting articles and for stacking in a stacking direction (2) with at least one other box (1) of the same type, wherein the box (1) has a base (3) and a side wall (4), which projects beyond the base (3) and surrounds the base (3) at least partially, wherein the base (3) and the side wall (4) together bound an accommodating space (5) for the articles, wherein the side wall (4) contains at least two, spaced-apart adapters in order for the box (1) to be gripped mechanically by means of at least one gripping device (6), said adapters in the side wall (4) being designed in each case in the form of channels (8) which extend longitudinally in a longitudinal-extent direction (7) running parallel to the stacking direction (2), wherein the channels (8) each have an entry opening (9) and an exit opening (10) and, therebetween, an inner channel cavity (12) which is bounded by a channel-boundary wall (11) of the box (1), extends longitudinally in the respective
(Continued)

longitudinal-extent direction (7) and through which the gripping device (6) is guided.

22 Claims, 8 Drawing Sheets

(58) Field of Classification Search
CPC ...... B65D 21/023; B65D 21/083; B65D 7/32; B65D 9/24; B65D 81/361
USPC .......... 206/512, 443, 565; 220/4.33, 4.34, 7, 220/23.86, 475, 538
See application file for complete search history.

(56) References Cited

U.S. PATENT DOCUMENTS

| | | | |
|---|---|---|---|
| 6,216,872 B1 * | 4/2001 | Haasbroek | B65D 11/1833 206/512 |
| 6,723,259 B1 | 4/2004 | Groth et al. | |
| 6,842,665 B2 * | 1/2005 | Karlen | B65G 1/0478 108/51.11 |
| 8,733,572 B2 * | 5/2014 | Ruiz Carmona | B65D 25/34 206/512 |
| 11,066,802 B1 * | 7/2021 | Nolen | H02G 3/086 |
| 2002/0119031 A1 | 8/2002 | Karlen | |
| 2016/0221729 A1 * | 8/2016 | Slattery | B65D 77/0466 |
| 2018/0346191 A1 * | 12/2018 | Chinni Vergottini | B65D 25/101 |
| 2019/0337677 A1 * | 11/2019 | Poran | B65D 25/54 |

FOREIGN PATENT DOCUMENTS

| | | |
|---|---|---|
| CN | 102991922 | 3/2013 |
| DE | 1900563 | 9/1964 |
| DE | 102005026579 | 12/2006 |
| EP | 1287780 | 3/2003 |
| WO | 9614251 | 5/1996 |

OTHER PUBLICATIONS

Small Load Carrier ("Kleinladunstrager") from Wikipedia, 4 pages, downloaded on Sep. 3, 2018.

* cited by examiner

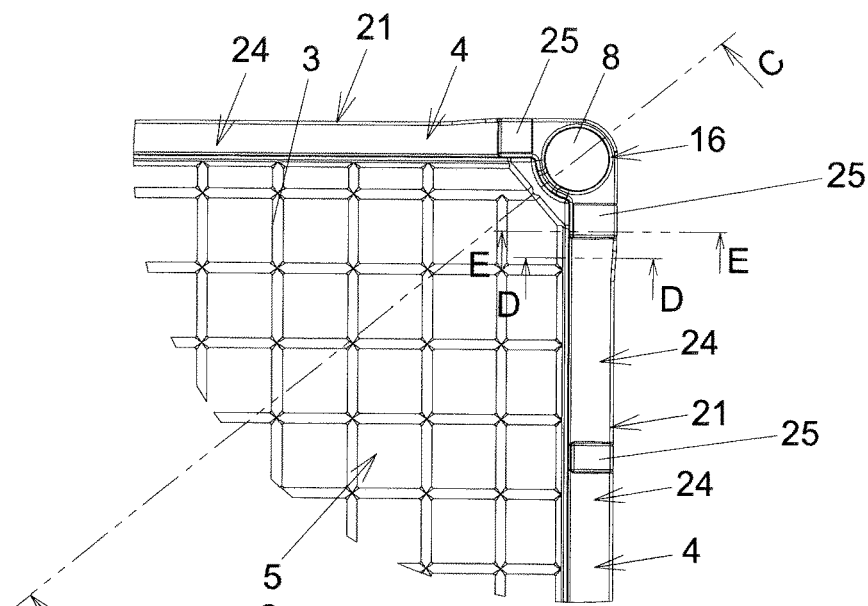
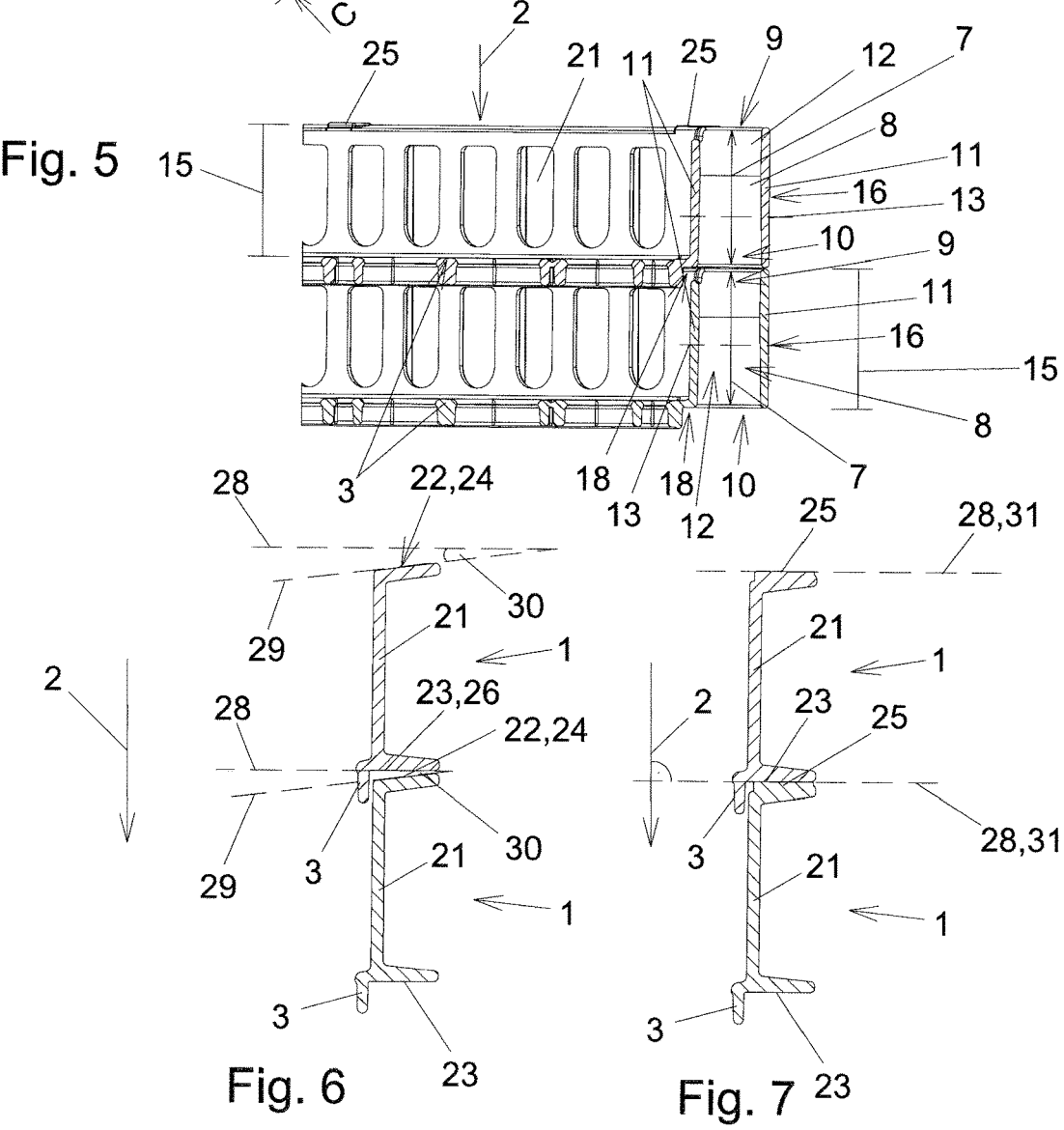
Fig. 4
Fig. 5
Fig. 6
Fig. 7

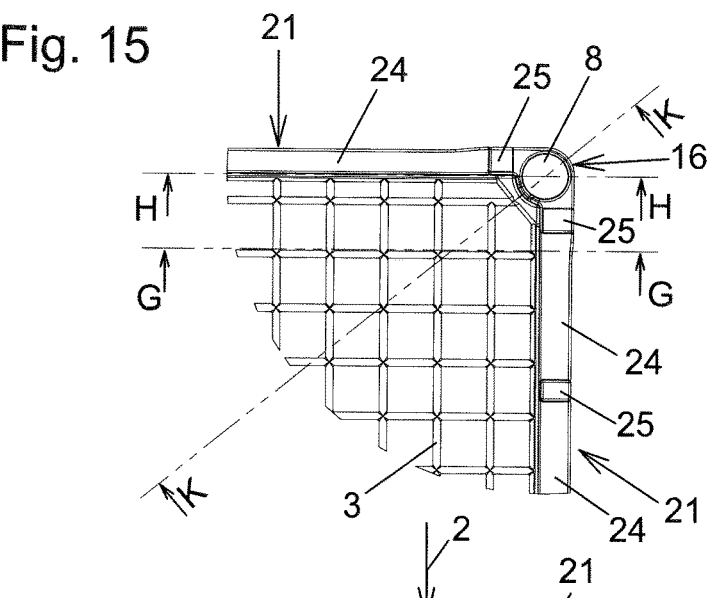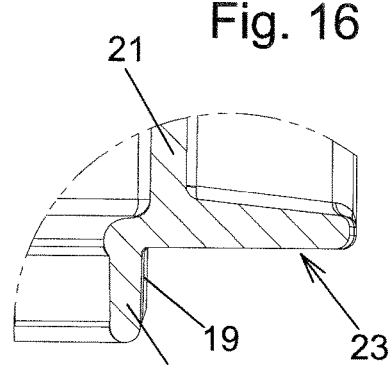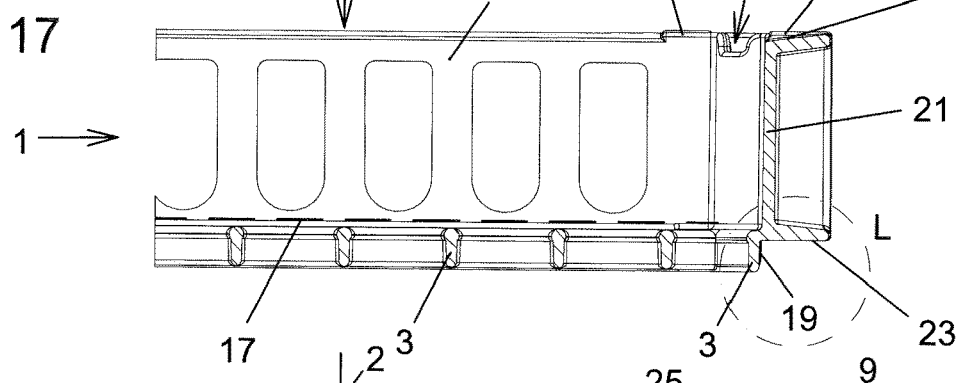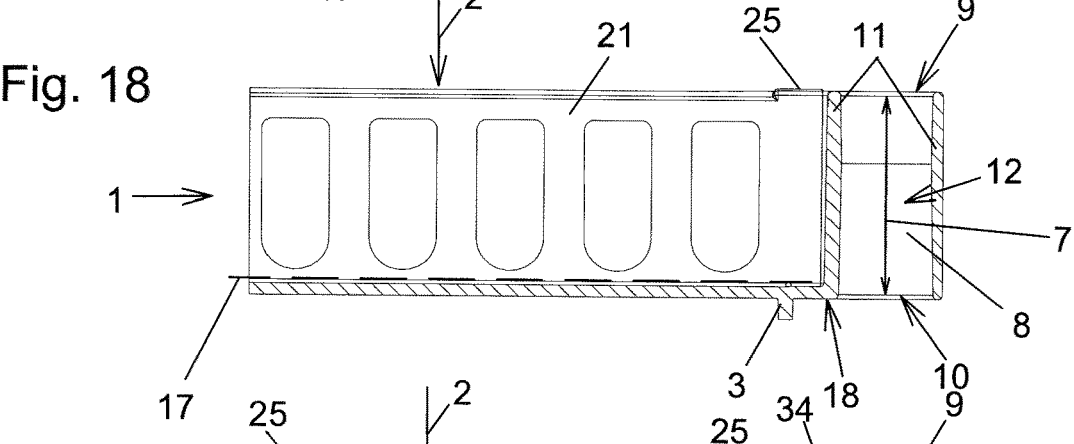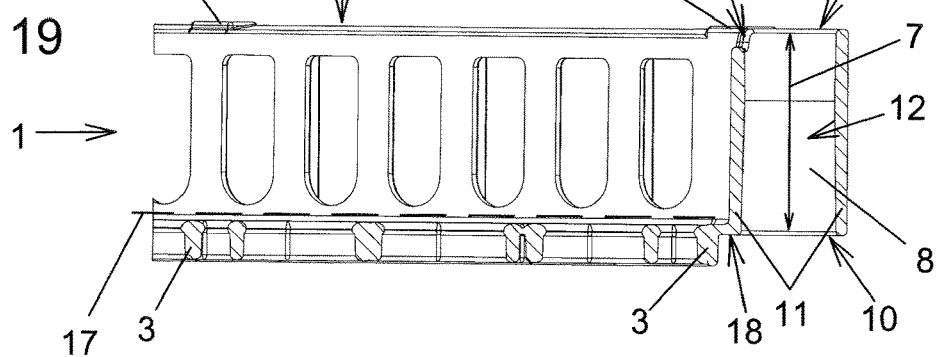

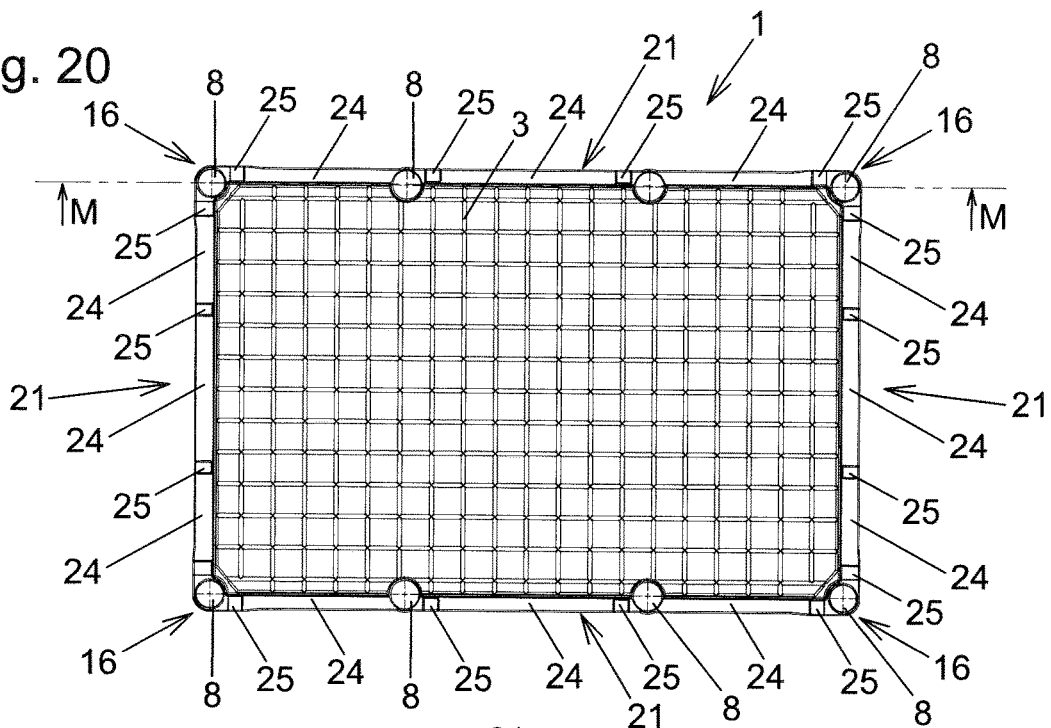
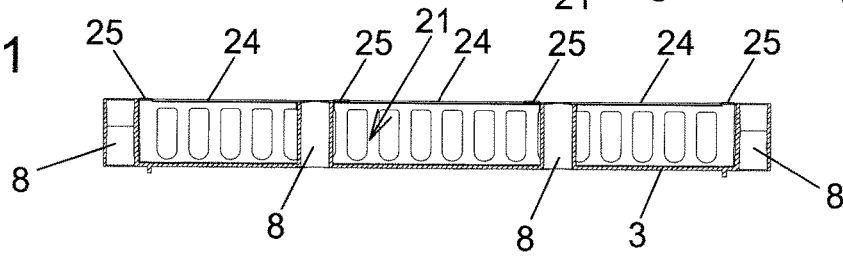
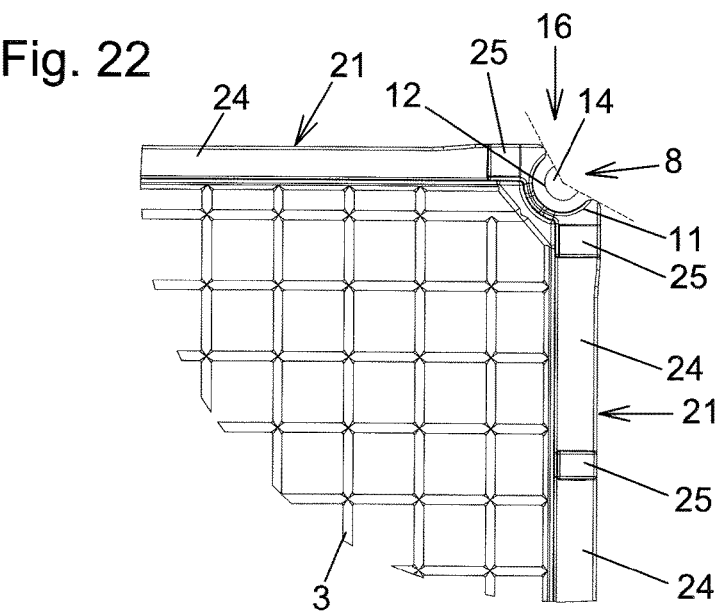
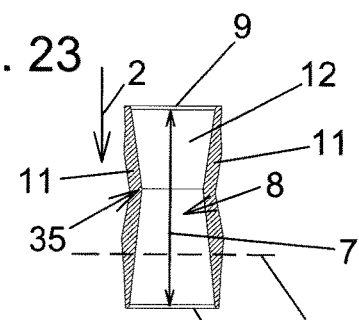
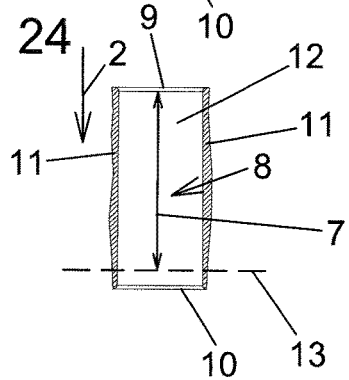

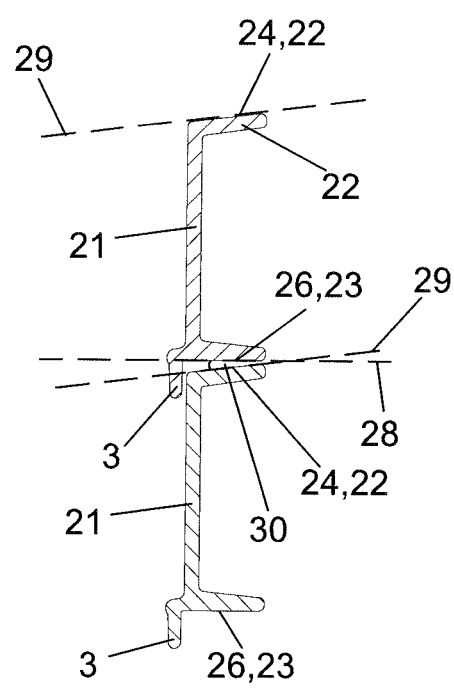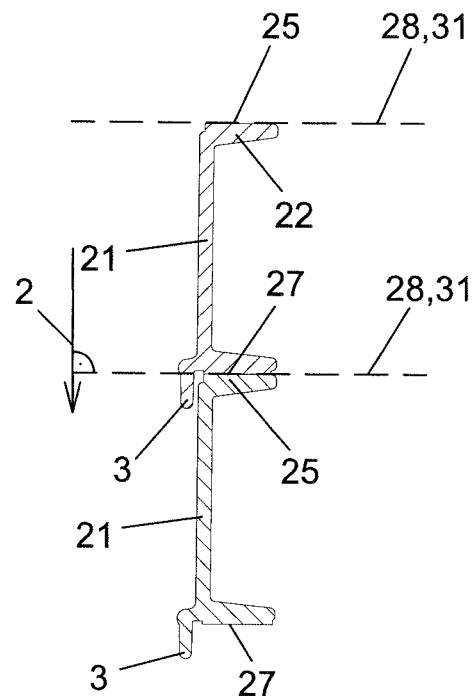

STACKABLE BOX

INCORPORATION BY REFERENCE

The following documents are incorporated herein by reference as if fully set forth: Austrian Patent Application No. A291/2018, filed Sep. 19, 2018.

BACKGROUND

The present invention relates to a stackable box for accommodating and for transporting articles and for stacking in a stacking direction with at least one other box of the same type, wherein the box has a base and a side wall, which projects beyond the base and surrounds the base at least partially, in particular fully, wherein the base and the side wall together bound an accommodating space of the box for accommodating the articles, wherein the side wall contains at least two, spaced-apart adapters in order for the box to be gripped mechanically by means of at least one gripping device.

Boxes of this type are provided so that, in addition to it being possible for them to be raised and shifted by hand, there is also the option of the box being gripped by a mechanical gripper in order for the box to be raised, transported or moved in some other way. For mechanical gripping purposes, special boxes and also special gripping devices have been developed in the prior art. These boxes are also described in the literature as small-load containers, Euro boxes, Euronorm containers, Euronorm boxes and the like. The gripping devices, for gripping the boxes mechanically, are adapted in each case to the special boxes. There are boxes and associated gripping devices which act on the outer sides of the side walls. There are also boxes in which the adapters in the side wall are designed in the form of apertures or holes in which the gripping device can engage in order to grip the box mechanically.

One disadvantage of the prior art is that, in the case of the hitherto known stackable boxes of the aforementioned type, only ever one individual box can be gripped mechanically by means of the gripping device.

SUMMARY

The object of the invention is therefore to provide a stackable box in the case of which the box can be gripped mechanically, by means of a gripping device, individually but also in a stack of such boxes.

In order to achieve this object, provision is made, in the case of a stackable box of the aforementioned type, for the adapters in the side wall to be designed in each case in the form of channels which extend longitudinally in a longitudinal-extent direction running parallel to the stacking direction, wherein the channels each have an entry opening and an exit opening and, therebetween, an inner channel cavity which is bounded by a channel-boundary wall of the box, extends longitudinally in the respective longitudinal-extent direction and through which the gripping device is guided through the entry opening and the inner channel cavity and the exit opening.

In the case of the boxes according to invention, it is therefore possible for the gripping devices, for mechanically gripping the individual box and also a stack, or part of a stack, of such boxes, to be guided through the entry opening, the inner channel cavity and the exit opening of the respective channel in the side wall of the box or, in the case of the stack or part of the stack, of the boxes. It is thus possible for an individual box to be gripped mechanically in order then to be raised, transported or moved in some other way. In the case of boxes correspondingly stacked one upon the other in the stacking direction, it is also possible, however, for the gripping devices to be guided in each case through a plurality of aligned channels of the various boxes stacked one above the other, and therefore two or more boxes can be simultaneously gripped mechanically by means of the gripping devices. It is thus possible for a plurality of boxes stacked one upon the other to be gripped simultaneously in order then to be raised, transported or moved in some other way. For this purpose, the gripping devices can be fastened, as known per se, on corresponding industrial robots or other lifting devices such as cranes and the like. The invention also makes it possible for different numbers of boxes stacked one upon the other to be correspondingly simultaneously gripped mechanically. In particular, it is possible also just for some of the boxes of a box stack to be gripped mechanically, by the gripping devices being guided just through the channels of those boxes which are to be gripped. This has made it possible for any desired number of boxes to be gripped mechanically in one gripping operation, that is to say simultaneously.

Alongside the stackable box per se, the invention also relates to an arrangement of boxes according to the invention stacked one upon the other in the case of which provision is made for at least two of the channels of in each case one of the boxes to be arranged in alignment with in each case one channel of the box arranged respectively beneath and/or above, in order for the gripping devices to be guided through.

A method for mechanically gripping boxes according to the invention stacked one upon the other preferably provides for at least two gripping devices to be guided in each case through the aligned channels of the boxes stacked one upon the other. Advantageously, provision is then also made for the gripping devices to be fixed in a releasable manner, with a form fit and/or friction fit, in each case, preferably only, in the lowermost of the stacked boxes which are to be gripped together. Once this has taken place, then the boxes of the stack can be simultaneously raised mechanically and transported or moved in some other way. It is just as straightforward, however, for an individual box to be gripped and raised, transported, etc.

Stackable boxes according to the invention could also be referred to as transport and/or storage boxes or, in general terms, as containers or transport containers. Even if they are designed for mechanical gripping by means of at least one gripping device, they can, of course, advantageously also be gripped and transported by hand.

The term mechanical gripping can be understood, generally, to mean that it concerns a gripping device making physical contact with a box such that, when the latter has been gripped mechanically, that is to say in other words is in mechanical contact with the gripping device or is held mechanically by the same, it can be raised, transported or moved in some other way by the gripping devices.

Stackable boxes according to the invention can be used for very different purposes. It is conceivable, in principle, for such stackable boxes to be used for storing, for washing and for transporting crockery, glasses and the like. It is particularly preferable, however, for such mechanically grippable stackable boxes according to the invention to be used industrially in order to store, transport, wash and the like articles which are to undergo industrial processing and those which are to be, or have been, manufactured. The minimum load of stackable boxes according to the invention is advantageously around at least 10 kg, particularly preferably around 25 kg, per box. Depending on the area of use, it is also possible for stackable boxes according to the invention to be of very different dimension. The boxes preferably have a rectangular or square basic shape. As far as the external dimensions are concerned, the length of the box advantageously ranges from 10 cm to 120 cm, preferably from 25 cm to 65 cm, and its width ranges from 10 cm to 100 cm, preferably 25 cm to 45 cm. In the case of preferred variants the height of the box ranges from 3 cm to 25 cm, preferably from 4 cm to 15 cm.

Boxes according to the invention can be formed of different materials or material compositions. They can be metal boxes, but also plastic boxes. Even boxes made of wood or composite materials are conceivable. Provision is preferably made, at any rate, for the stackable box to be formed in one piece. This then also means that the side wall and the base are then connected to one another in one piece and are formed of the same material. For example, boxes according to the invention can be made of a suitable plastic such as, for example, polypropylene (PP), polyamide (PA), polyoxymethylene (POM) or polybutylene terephthalate (PBT). Boxes according to the invention can be produced, for example, by injection molding.

Boxes according to the invention have a base, which bounds the accommodating space of the box, it being possible for the articles to be introduced into said accommodating space, together with the surrounding side wall. Usually, the box is placed on the underlying surface by way of the base such that the articles in the accommodating space rest on the base. The base therefore usually forms the bearing surface for the articles in the accommodating space of the box. Toward the sides, the accommodating space is bounded by the surrounding side wall of the box. The side wall here, in continuous state, can fully enclose the base. However, it can also be configured from a plurality of constituent parts which are interrupted. Even then, the side wall can still be a surrounding one. Both the side wall and the base can be designed in the form of continuous surfaces. However, it is equally possible for lattice-form structures, that is to say through-passages, windows, reinforcing ribs and the like, to be provided in the base and/or in the side wall. In preferred configurations, the surrounding side wall is made up of corner regions and side-wall portions, preferably rectilinear ones, which run between the corner regions. In preferred configurations, as seen in a plan view of the box, the side wall can have a rectangular basic shape. The term rectangular here can be understood not just in the strict mathematical sense. It also includes configurations in which, although the side-wall portion coincides with the corner region basically at right angles, the corner region itself nevertheless has rounded portions and the like, etc.

Boxes according to the invention, in any case, are designed such that they can be stacked one upon the other in a stacking direction together with other boxes of the same type. The stacking direction here, as known per se in the prior art, is predetermined usually by the shape of the box and/or of the base and the side wall thereof. For example, the base can project beyond the side wall, and therefore said projecting region of the base of a box can be positioned in the upper region of the accommodating space of the box beneath, that is to say in the region which is enclosed by the side wall, and therefore the base of the upper box is retained in a form-fitting manner, in the direction of the sides, by the side wall of the lower box. This also automatically dictates the appropriate stacking direction in which the boxes have to be stacked one upon the other. In the case of boxes with a plurality of possible stacking directions, it is necessary to realize the features according to the invention in respect of at least one stacking direction, so that the box is a box according to the invention.

In the case of preferred configurations of boxes according to the invention, provision is made for the base to form an upper, in particular planar, boundary surface, by means of which the base bounds the accommodating space. The stacking direction then advantageously runs normal to said upper boundary surface of the base. In other words, the stacking direction then forms a surface normal to said upper boundary surface of the base. In an operating position of the box, the upper boundary surface of the base bounds the accommodating space of the box in the downward direction, whereas the side wall bounds the accommodating space, in this position of the box, in the direction of the sides, that is to say horizontally. The boundary surface is defined here by the upper side of the base. This also applies when the base is designed in the form of a lattice or the like. The upper, in particular planar, boundary surface is the surface on which, in the operating position, the articles stored in the accommodating space of the box rest. The stacking direction is used at several points here as a reference direction in the definition of the invention. As an alternative to the stacking direction, it would also be possible to make use, as a geometric reference, of the aforementioned upper, in particular planar, boundary surface of the base, in which case it would then be assumed that the stacking direction forms a surface normal to said upper boundary surface of the base, that is to say, in general terms, it is located orthogonally on the upper boundary surface of the base.

Boxes according to the invention can be open in the upward direction, that is to say on that side of the side wall which is directed away from the base. In other words, such boxes have an accommodating space which is open in the upward direction. However, it is, of course, also possible, in principle, for stackable boxes according to the invention to be closed by a cover on that side of the accommodating space which is located opposite the base, a corresponding cover being fitted in this case on said side of a side wall.

BRIEF DESCRIPTION OF THE DRAWINGS

Further features and details of preferred configurations of the invention will be explained by way of example in the following description of the figures, with reference to exemplary embodiments of the invention. It should be pointed out here that, although the individual preferred features are shown in combination with one another in the exemplary embodiments, this does not mean that these preferred features always have to be present in this combination in order for the invention to be realized. All the preferred features and variants outlined hereinbelow should therefore also be considered in their own right, and it is also possible for them to be realized, in combination with other preferred features of the invention, in exemplary embodiments other than those exemplary embodiments of the invention which are shown. In the figures:

FIG. 4 shows the region B from FIG. 3 on an enlarged scale;

FIG. 5 shows the section taken along section line CC from FIG. 4;

FIG. 6 shows the section through the side wall taken along section line DD from FIG. 4;

FIG. 7 shows the section through the side wall taken along section line EE in FIG. 4;

FIG. 15 shows the region F from FIG. 14 on an enlarged scale;

FIG. 16 shows the section taken along section line GG from FIG. 15;

FIG. 17 shows the region L from FIG. 16 on an enlarged scale;

FIG. 18 shows the section taken along section line HH from FIG. 15;

FIG. 19 shows the section taken along section line KK from FIG. 15;

FIG. 20 shows an alternative configuration of a box according to the invention in the case of which channels are also provided in the side-wall portions;

FIG. 21 shows a vertical section taken along section line MM from FIG. 20;

FIG. 22 shows a corner region of a box according to the invention in the case of which, in contrast to exemplary embodiments outlined previously, the channel is not in a circumferentially closed configuration;

FIGS. 23 and 24 show different sectional illustrations relating to possible configurations of the inner channel cavity;

FIGS. 29 and 30 show illustrations analogous to FIGS. 27 and 28 for a further alternative configuration.

DETAILED DESCRIPTION

Figure 1:
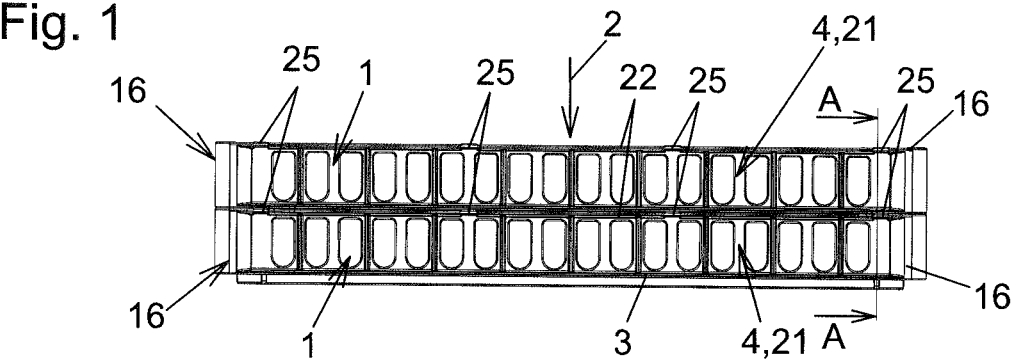
FIG. 1 shows a side view of a first exemplary embodiment of the invention of two boxes according to the invention stacked one upon the other.

The text which follows, in the first instance, will deal with the first exemplary embodiment of the invention, which is illustrated in FIGS. 1 to 19. The subsequent description of the further exemplary embodiments then concentrates on the differences in relation to the first exemplary embodiment.

In FIGS. 1 to 11, the first exemplary embodiment of the box 1 according to the invention has been stacked in the stacking direction 2 on another box 1 of the same type, according to the invention. FIGS. 12-19 show the first exemplary embodiment of said box 1 on its own, or show sub-regions of the same.

The box 1 has a base 3 and a side wall 4, which projects beyond the base 3, parallel to the stacking direction 2, and surrounds the base 3, in this exemplary embodiment fully. The base 3 and the side wall 4 together bound the accommodating space 5 of the box 1, said accommodating space being provided in order to accommodate the articles in the box. As seen in the operating position, which is illustrated for example in FIGS. 1 and 2, the accommodating space 5 is bounded in the downward direction by an upper, in this case planar, boundary surface 17 of the base 3. The stacking direction 2 forms a surface normal to said upper boundary surface 17 of the base 3. In other words, the stacking direction 2 runs normal to the upper boundary surface 17 of the base 3. It is also the case in this exemplary embodiment that the stacking direction 2 is predetermined in that, in order for the boxes 1 to be stacked one upon the other, the base 3 of the respectively upper box 1 has to be introduced into the upper region of the accommodating space 5 of the respectively lower box 1, said accommodating space being enclosed by the side wall 4. As can be seen to good effect for example in FIG. 2, this gives rise to a form fit in a direction orthogonal to the stacking direction 2. As a result, in order to be stacked one upon the other, the boxes 1 have to be positioned one upon the other in the stacking direction 2 and, for de-stacking purposes, the respectively upper box, or boxes 1 have to be raised up, counter to the stacking direction 2, from the respectively lower box, or boxes 1. As already explained in the introduction, both the base 3 and the side wall 4 can be designed in the form of continuous surfaces. In this exemplary embodiment, this is not the case. Here, both the base 3 and the side walls 4 each have through-passages or openings. In this exemplary embodiment, the base 3 is formed by a lattice-form structure. The side wall 4 has a multiplicity of window-like openings. All this, of course, is illustrated merely by way of example and can also be configured in other ways which are known per se. In particular, it is also possible, if necessary for the respectively intended use purpose, for reinforcing ribs and the like to be formed both on the base 3 and on the side wall 4. The boxes 1 shown here have a rectangular basic shape with four corner regions 16, in this exemplary embodiment of rounded design. Side-wall portions 21 in each case run between the corner regions 16. In the variants shown here, the side wall 4, which surrounds the base 3 in each case fully, is thus formed from the four corner regions 16 and the side-wall portions 21, preferably rectilinear ones, which run in each case therebetween. Of course, boxes 1 according to the invention with a non-rectangular basic shape are also conceivable and possible. The preferred side-wall portions 21 realized here are each of straight and/or linear design. They come into contact with an adjacent side-wall portion 21 at an orthogonal angle in the corner regions 16 in each case. Even this, of course, need not necessarily be so. For example, it is, of course, also possible for the number of corner regions 16, and the number and shape of side-wall portions 21, to be different.

The boxes 1 are designed with spaced-apart adapters in order for the box 1 to be gripped mechanically by means of at least one gripping device 6. According to the invention, the adapters in the side wall 4 are designed in each case in the form of channels 8 which extend longitudinally in a longitudinal-extent direction 7 running parallel to the stacking direction 2, wherein the channels 8 each have an entry opening 9 and an exit opening 10 and, therebetween, an inner channel cavity 12 which is bounded by a channel-boundary wall 11 of the box 1, extends longitudinally in the respective longitudinal-extent direction 7 and through which the gripping device 6 is guided through the entry opening 9 and the inner channel cavity 12 and the exit opening 10. Advantageously, as is also the case here, the channel-boundary wall 11 is designed in each case in the form of a sub-region of the side wall 4. In preferred configurations, as also shown here in the first exemplary embodiment, provision is made for the channel-boundary wall 11 to bound the inner channel cavity 12 in a circumferentially closed manner. Circumferentially closed here means that the channel-boundary wall 11 encloses the inner channel cavity 12 over a circumferential angle of 360°. As far as the first exemplary embodiment is concerned, this can be seen to good effect in the FIGS. 3, 4, 9, 12 to 14 and 15. The circumferentially closed design is also seen in a section plane 13 normal to the stacking direction 2. Such section planes 13 are depicted by way of example in FIG. 5. Advantageously, as also shown in the first exemplary embodiment, the channels 8 are formed in each case in a corner region 16 of the side wall 4. For the purpose of stable gripping of the box 1, or stacked boxes 1, at least two channels 8 are advantageously formed in each box, or in the side wall 4 thereof. Preferred configurations provide for the side wall 4 to contain at least four, preferably precisely four, channels 8.

The channels 8 arranged in the side wall 4, and in preferred configurations in the corner regions 16, allow a corresponding gripping device 6 to be guided through them and therefore the appropriately designed gripping device 6 can penetrate through the entry opening 9, the inner channel cavity 12 and the exit opening 10 of the respective channel 8. For this purpose, the shape of the gripping device and the shape of the channel 8 should be coordinated with one another, in principle a variety of shapes being conceivable and possible. Provision is preferably made for the inner channel cavity 12 of the respective channel 8 to have, at least in part, a circular cross section, as is also the case in the first exemplary embodiment shown here. This is seen in the first exemplary embodiment, for example, from the shape of the entry opening 9 and also from the shape of the exit opening 10 and also in a corresponding section through the respective channel 8 in a section plane 13 normal to the stacking direction 2. It is preferably the case that the channel 8 has its longitudinal-extent direction 7 extending over the entire vertical extent 15 of the side wall 4, or at least most of said vertical extent, in the region of the respective channel 8 in a direction parallel to the stacking direction 2. Provision is advantageously made here so that, in the region of the respective channel 8, the side wall 4 has a vertical extent 15 in a direction parallel to the stacking direction 2, and the channel 8 extends over at least 50%, preferably over at least 80%, of said vertical extent 15 of the side wall 4. It can be seen to particularly good effect in FIG. 5 that, in this first exemplary embodiment, the channel 8 extends over more or less the entire vertical extent 15 of the side wall 4. It is also advantageous if the longitudinal extent of the respective channel 8 is at least the same size, preferably double the size, over its longitudinal-extent direction as the diameter of the entry opening 9 or of the exit opening 10. If there is any doubt, use should be made here of the largest of these diameters.

In an arrangement of boxes 1 according to the invention stacked one upon the other, provision is advantageously made for the preferably at least two of the channels 8 of in each case one of the boxes 1 to be arranged in alignment in each case with a channel 8 of the box 1 arranged respectively beneath and/or above, in order for a gripping device 6 to be guided through. This can be seen to good effect in FIGS. 5, 10 and 11, wherein there is no gripping device 6 shown in FIG. 5, whereas, in FIG. 10, the gripping device 6 has been guided through the two channels 8, aligned one above the other, of the boxes 1 stacked one upon the other and, in FIG. 11, the gripping device 6 has been guided only through the channel 8 of the upper box 1.

In order that the respective gripping device 6 can be guided without obstruction through the corresponding channels 8 of the boxes 1 stacked one upon the other, preferred configurations of the invention provide for the box 1 to be free, preferably completely so, of wall regions which conceal, in particular fully, the respective entry opening 9 and the respective exit opening 10 of the respective channel 8 in its respective longitudinal extent 7. In other words, provision is thus advantageously made at least for the box 1 not to have any wall regions which fully conceal the entry opening 9 and the exit opening 10 of the respective channel 8. This ensures that the gripping device 6 can be guided without obstruction through the channels 8 of the boxes 1 stacked one upon the other. Provision is advantageously made here for the box to be completely free of such wall regions which conceal, even only partially, the entry opening 9 and the exit opening 10 of the respective channel. For the sake of completeness, however, it should be pointed out that, in the case of an appropriate configuration of the gripping device 6, it would be possible to have wall regions which conceal the entry opening 9 and the exit opening 10 partially, if the gripping device 6 can be guided past said wall regions and can also still be guided through the entry opening 9 and the exit opening 10 of the respective channel 8.

For mechanical gripping of boxes 1 according to the invention stacked one upon the other, a preferred method provides for at least two gripping devices 6 to be guided in each case through the aligned channels 8 of the boxes 1 stacked one upon the other, and the gripping devices 6 are fixed in a releasable manner, with a form fit and/or friction fit, in each case, preferably only, in the lowermost of the stacked boxes 1 which are to be gripped together. In other words, provision is thus advantageously made for the gripping device 6, for gripping a certain number of boxes 1 stacked one upon the other, not to fix each individual one of said boxes 1 with a form fit and/or friction fit; rather, in simple terms, this releasable fixing action takes place, with a form fit and/or friction fit, only on the lowermost box 1 of the stacked number of boxes 1 which are to be gripped. When said lowermost box 1 of the stack is raised by means of the gripping device 6, the boxes 1 arranged above it in the box stack are automatically raised along with it. For releasable fixing of the box 1, or of the lowermost box 1, of the box stack which is to be raised up, the gripping device 6 can act in various ways, with a form fit and/or friction fit, on the respective channel 8 of the box 1. For example, it is conceivable for the gripping device 6, within the aforementioned channel 8, to have its diameter enlarged for example by corresponding pressure pads or the like, and it is therefore fixed in a releasable manner by means of a friction fit, on the channel-boundary wall 11, which encloses the inner channel cavity 12. It is preferred, however, for the respective gripping device 6 to be fixed in a releasable manner with a form fit in or on the respective channel 8 of the corresponding box 1, as is also shown in a highly schematic manner in FIGS. 8 to 11. The variant of the gripping device 6 shown in said figures has a catch 20, which can be displaced in a direction orthogonal to the stacking direction 2 and can engage in a corresponding undercut 18 in and/or on the channel-boundary wall 11. Provision is advantageously made here for the channel-boundary wall 11 of the respective channel 8 to contain, in and/or on it, at least one undercut 18 in order to form, with the gripping device 6, a form fit acting in the longitudinal-extent direction 7 of the channel 8. It can be seen to good effect in FIGS. 5, 10 and 11 that said undercut 18 can be formed for example in the region of the exit opening 10 of the respective channel 8. In the variant shown, the appropriately extended catch 20 can engage with a form fit behind said undercut 18 of the corresponding box. In order to create sufficient space for the catch 20, it is possible, as is the case in the exemplary embodiments shown here, for a clearance 34 to be incorporated in the region of the entry opening 9 of the respective channel 8, said clearance creating sufficient space in order for the catch 20 to be introduced. In order to engage behind the respective undercut 18 with a form fit, the catch 20 is extended relative to the gripping device 6, as can be seen to good effect in FIGS. 10 and 11. When the respective gripping device 6, in contrast, is to be retracted into the channel or channels 8, or is to be pulled out of the same again, the catch 20 is adjusted into a pulled-back position (not illustrated here), in which it does not project beyond the gripping device 6 in a direction orthogonal to the stacking direction 2, or to the longitudinal-extent direction 7 of the channels 8, and therefore, in this position, it does not collide with the channel-boundary walls 11 of the channels 8 and, accordingly, the gripping device 6 can be introduced into the appropriate number of channels 8, or pulled out of the same.

Figures 10, 11:
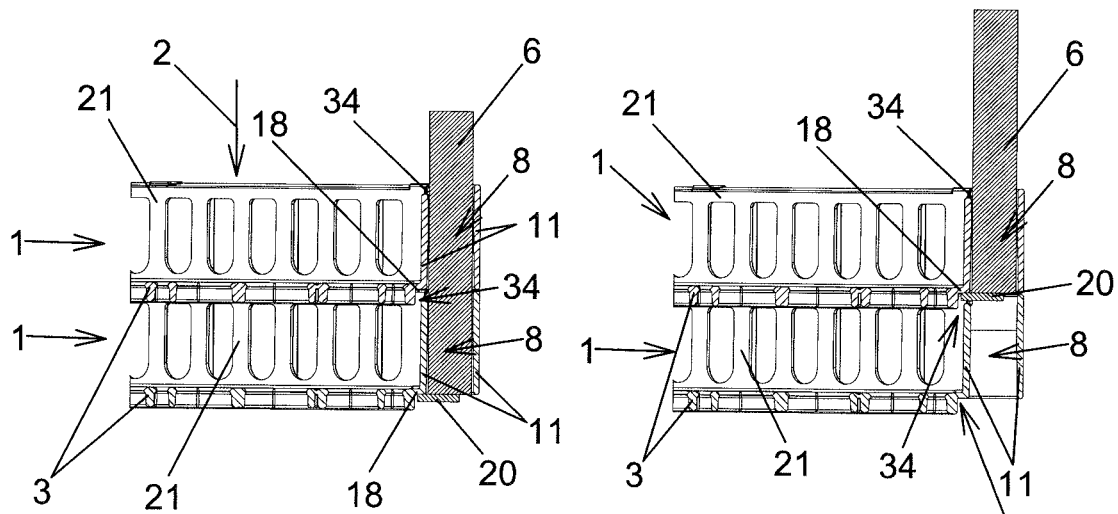
FIGS. 10 and 11 show sectional illustrations analogous to section line CC from FIG. 4, wherein the gripping device shown has been introduced into the channels in each case in order to grip different numbers of boxes.

This technology makes it possible for a desired number of boxes 1 stacked one upon the other to be gripped mechanically and simultaneously by the corresponding number of gripping devices 6 by virtue of the gripping devices 6 being introduced appropriately far into the aligned channels 8 of the boxes 1 stacked one upon the other, and of the lowermost one of the desired number of boxes 1 being appropriately fixed in a releasable manner, with a form fit and/or force fit, in order then for the stack of boxes 1 gripped in this way to be correspondingly raised, transported and/or moved in some other way. The gripping devices 6 here can be moved by lifting apparatuses which are known per se, robots, cranes or the like. FIG. 10 shows, by way of example, how the gripping device 6 uses its catch 20 to grip the lowermost one of the two boxes 1 with a form fit, and therefore the two boxes 1 stacked one upon the other shown in FIG. 10 are mechanically gripped together by the gripping device 6. In FIG. 11, in contrast, the gripping device 6 has been moved only into the channel 8 of the upper box 1, and locked in the undercut 18 thereof with a form fit, and therefore, in FIG. 11, it is only the upper box 1 of the box stack illustrated which is gripped mechanically. Even if the accompanying figures only show this, by way of example, for a stack comprising two boxes 1, it is, of course, possible for this technology to be realized in a corresponding manner for the purpose of gripping more or less any desired number of boxes 1 stacked one upon the other. It is possible here for an entire stack, but also just part of a stack, of boxes 1 to be gripped mechanically.

Figure 8:
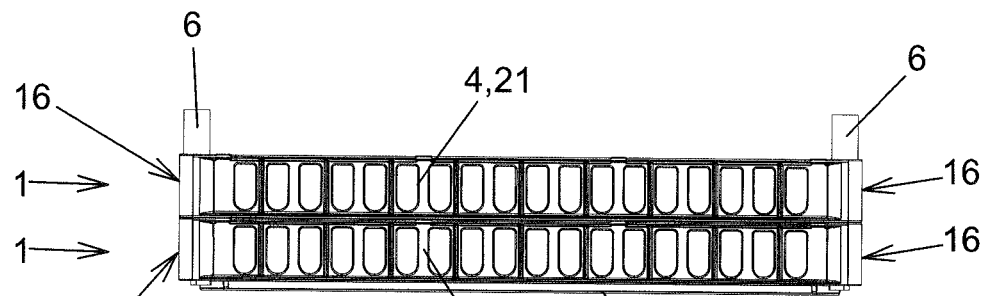
FIG. 8 shows the two boxes from FIG. 1, gripping devices having been introduced into the channels of the boxes.
Figure 9:
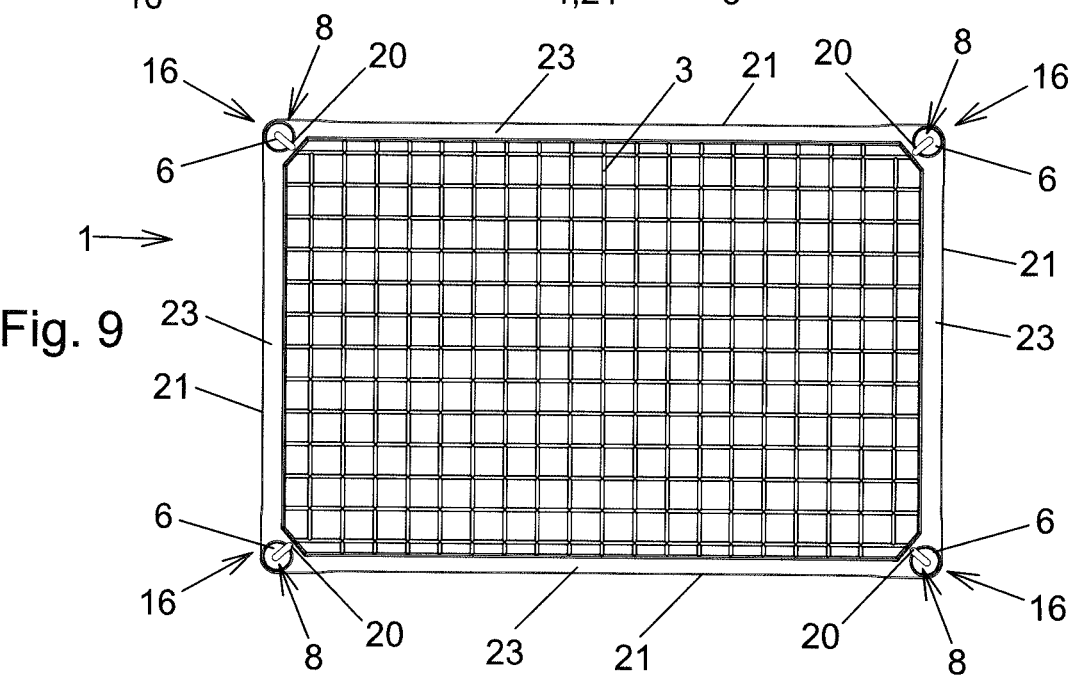
FIG. 9 shows a view from beneath of the situation according to FIG. 8.

FIGS. 8 and 9 show a side view, and a view from beneath, of the situation according to FIG. 10, in which the two boxes 1 are mechanically gripped simultaneously by the gripping devices 6.

Figure 2:
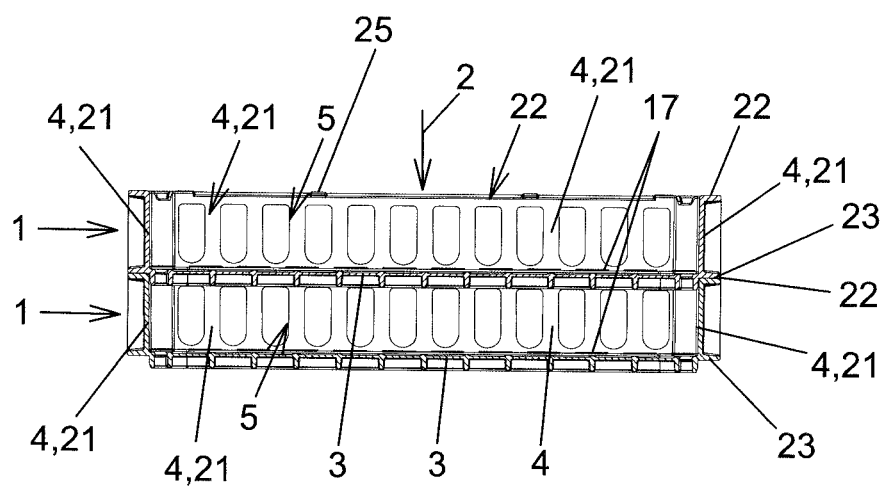
FIG. 2 shows a vertical section taken along section line AA from FIG. 1.
Figure 3:
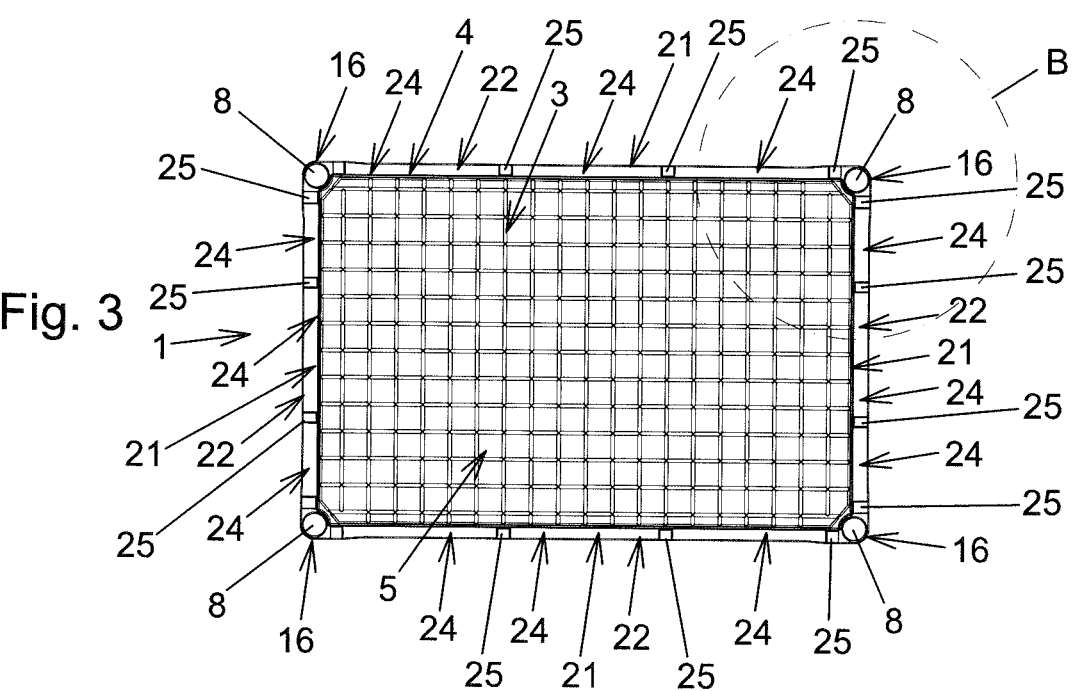
FIG. 3 shows a plan view of the box stack according to FIG. 1.
Figure 12:
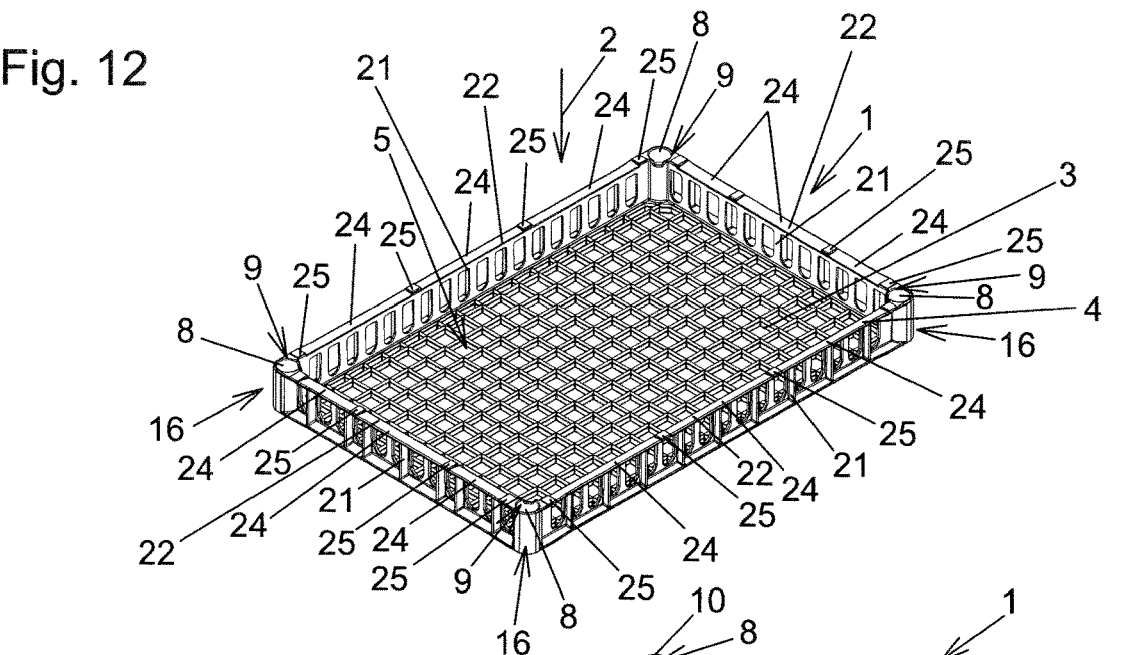
FIG. 12 shows a perspective view of one of the boxes of the box stack in FIG. 1 as seen obliquely from above.
Figure 13:
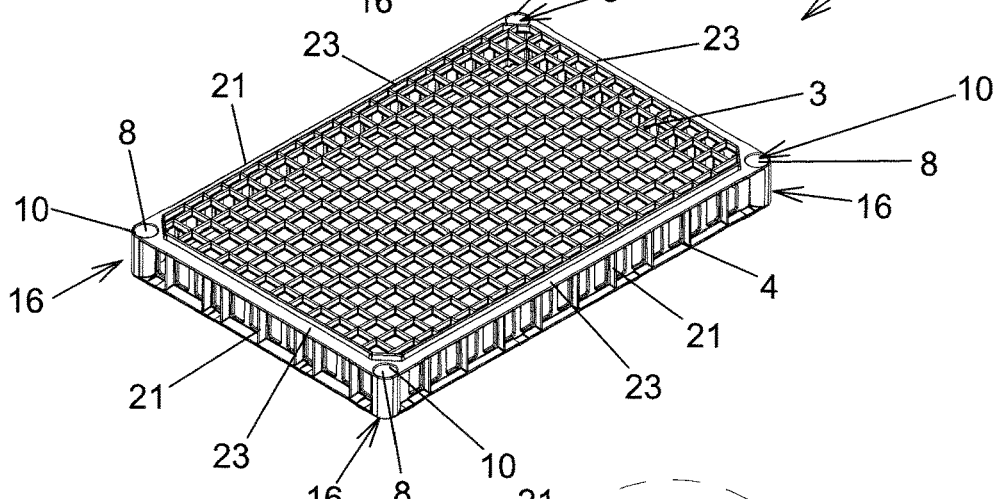
FIG. 13 shows an oblique view of the base of said box from FIG. 12.
Figure 14:
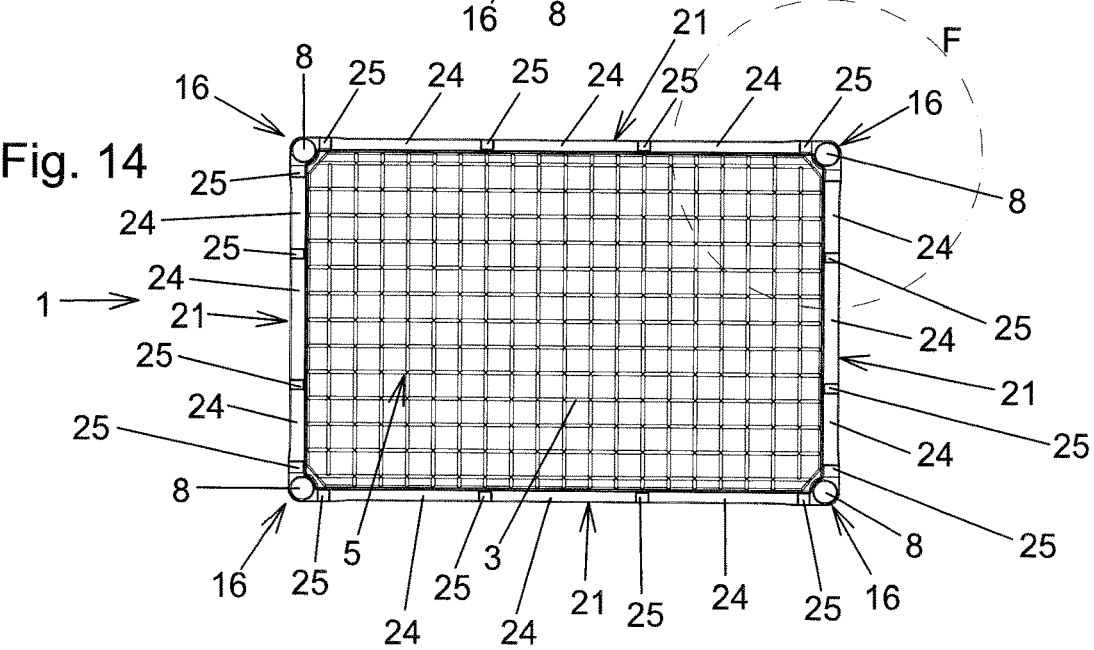
FIG. 14 shows a plan view of said box from FIG. 12.
Figure 25:
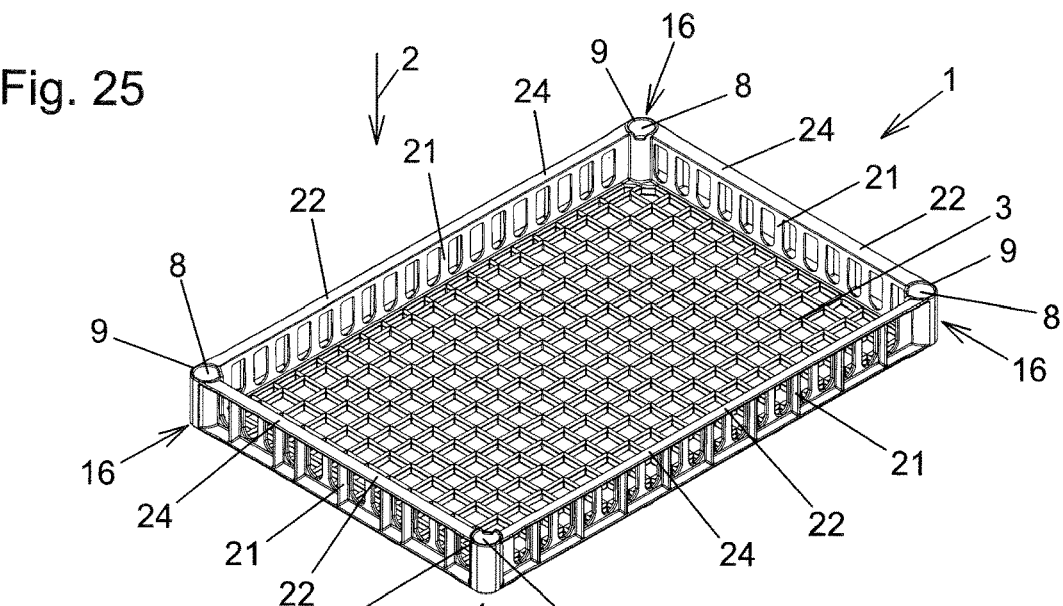
FIGS. 25 and 26 show a further exemplary embodiment of the invention in a view seen obliquely from above and in an oblique view of the base of the box.
Figure 26:
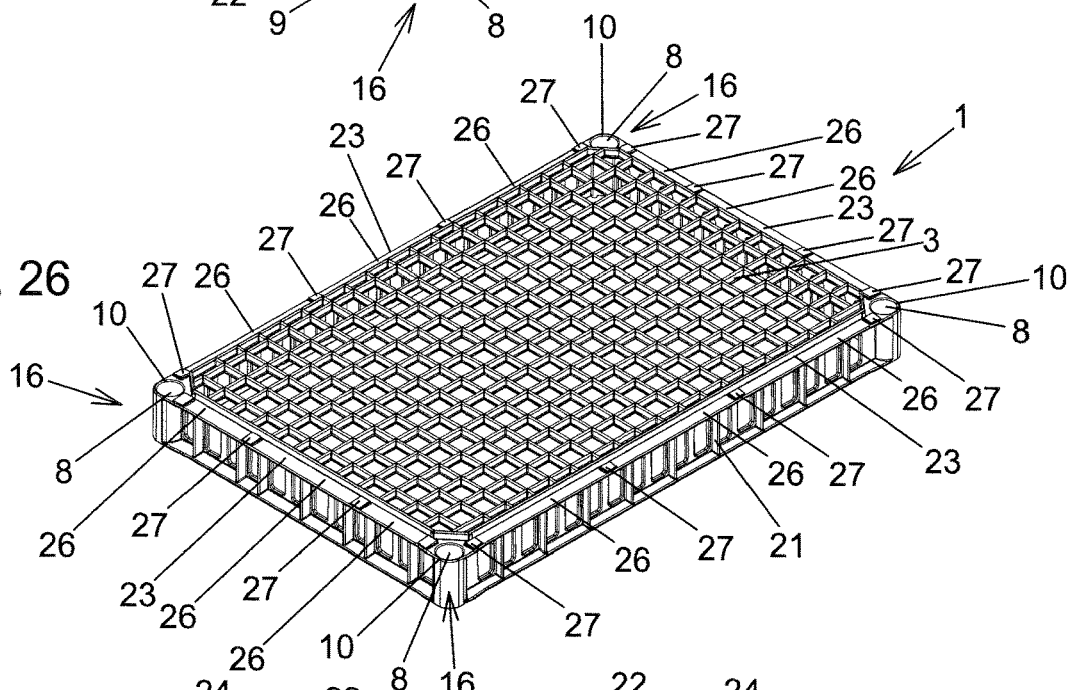

FIGS. 12, 13 and 14 show an individual one of the boxes 1 stacked one upon the other in the previous figures. FIG. 12 shows a view seen obliquely from above into the accommodating space 5. FIG. 13 shows a view seen obliquely from above of the box turned over, that is to say of the base 3 of the box. FIG. 14 shows a plan view of the box 1. The detail F from FIG. 14 is shown in FIG. 15. Section lines GG, HH, and KK are depicted in FIG. 15. FIG. 16 shows the section taken along section line GG. FIG. 17 shows the region L from FIG. 16 on an enlarged scale. It is possible to see here the preferably wedge-shaped orienting surface 19, which in this exemplary embodiment is formed on an outer side of the base 3. When the boxes 1 are stacked one upon the other, this orienting surface 19 ensures that the boxes stacked one upon the other are oriented and/or centered relative to one another, in that, during the stacking operation in the stacking direction 2, the base 3 of the respective box 1, as can be seen in FIG. 2, penetrates into the upper region of the accommodating space 5 of the box 1 beneath and ends up interacting with the upper periphery of the side wall 4 of the lower box 1. The orienting surfaces 19, which are arranged in an appropriately distributed manner on the box 1 or the base 3 thereof, cause the boxes 1 which are stacked one upon the other to be oriented in relation to one another in a horizontal direction, that is to say in the direction normal or orthogonal to the stacking direction 2, such that the channels 8 of the boxes 1 stacked one above the other are in alignment. In general terms, preferred variants of the invention therefore provide for preferably wedge-form orienting surfaces 19 to be formed on the box 1, in order for the channels 8 of boxes 1 stacked one upon the other to be oriented in alignment relative to one another. For the sake of completeness, it is pointed out that it is, of course, also possible for corresponding orienting surfaces 19 to be shaped differently and formed at other locations of the respective box 1. For example, it is conceivable for the orienting surfaces 19, rather than being arranged on the base 3, to be arranged on the corresponding regions of the upper periphery of the side wall 4, and therefore, when the boxes 1 are stacked one upon the other in the stacking direction 2, they interact correspondingly with the base 3 of the box 1 stacked above and ensure that the channels 8 of the boxes 1 stacked one above the other are oriented correspondingly.

FIG. 19 shows once again to good effect the lower exit opening 10, which serves as an undercut 18, and the corresponding clearance 34 in the region of the entry opening 9 for the catch 20. In respect of the terms entry opening 9 and exit opening 10, it is pointed out that these are here ultimately just openings of the channel 8 and/or the corresponding ends of the inner channel cavity 12. The terms entry opening 9 and exit opening 10 have been chosen for the sake of simplicity. The entry opening is the opening of the channel 8 at which a gripping device 6 is pushed into the channel 8 from above. The exit opening 10 has been so called since, when the gripping device 6 is pushed into the channel 8 from above, the gripping device 6, once pushed through the channel 8, exits the channel 8 again at the exit opening 10. When the gripping device 6 is being pulled out of the channel 8, the terms entry opening 9 and exit opening 10 should really, strictly speaking, be used the other way around. For the sake of simplicity, however, the terms have not been swapped around. It would also be possible for the entry opening 9 to be referred to as the first opening and for the exit opening 10 to be referred to as the second opening.

FIGS. 20 and 21 show a second exemplary embodiment of a box 1 according to the invention, in the case of which, in addition to the four channels 8 arranged in the corner regions 16, additional channels 8 are arranged in the longer side-wall portions 21. FIG. 20 here shows a plan view, and FIG. 21 shows the section taken along section line MM from FIG. 20. This serves to demonstrate that the channels 8 need not necessarily be arranged in corner regions 16 of the box 1. The intention is to demonstrate that the channels 8 can also be arranged in other regions of the side wall 4, and also in the region of the side-wall portions 21, which are arranged between the corner regions 16. For the sake of completeness, it is pointed out that the corner regions 16 can also be entirely devoid of channels 8, when the channels 8 are then realized correspondingly in other regions of the side wall 4.

FIG. 22 shows a corner region 16 of a box 1 in the case of which the channel 8 is not of circumferentially closed design. In other words, in this exemplary embodiment of the invention, the inner channel cavity 12 is not circumferentially closed, that is to say bounded by the channel-boundary wall 11 with a circumferential angle of 360°. In such configurations, however, it is advantageous if, in particular as seen in a section plane 13 normal to the stacking direction 2, the channel-boundary wall 11 bounds the inner channel cavity 12 at least partially over a circumferential angle 14 of at least 180°. This is the case in FIG. 22, as shown by the circumferential angle 14 depicted.

FIGS. 23 and 24 serve to demonstrate various possible ways in which an in particular circumferentially closed channel 8, or its channel-boundary wall 11 and inner channel cavity 12, can be designed. In both variants, provision is, indeed, made so that, as seen in a corresponding section plane 13 normal to the stacking direction 2, the inner channel cavity 12 of the respective channel 8 has a circular cross section throughout. In the variant according to FIG. 23, however, the inner channel cavity 12 is formed by two truncated cones which meet at a narrowed region 35, whereas, in the variant according to FIG. 24, the inner channel cavity 12 has a circular-cylindrical shape throughout. The narrowed region 35 in the variant according to FIG. 23 can serve, for example, to fix an appropriately designed gripping device 6 in a releasable manner, with a form fit, in the respective channel 8. The narrowed region 35 is therefore another possible way of realizing the undercut 18 which has already been discussed above.

In order further to improve the box 1 according to the invention to the effect that, on the one hand, it is stacked with high loads and/or heavy articles in the accommodating space 5, and, on the other hand, it can nevertheless also be provided with side-wall portions 21 which dry to good effect, provision is advantageously made, in respect of the stackable boxes 1, so that, as seen in a plan view of the box 1, the side wall 4 has a preferably rectangular basic shape with preferably four corner regions 16 and side-wall portions 21, which run between the corner regions 16, wherein the side-wall portions 21, which run between the corner regions 16, are bounded in each case by an upper side 22 of the side-wall portion 21, said upper side being inclined at least partially obliquely in relation to the stacking direction 2, and by an underside 23 of the side-wall portion 21, said underside being arranged opposite the upper side, wherein the side-wall portions 21 have formed on them, on the upper sides 22 of the side-wall portions 21, in each case adjacent to at least one region 24 of the respective upper side 22, said region being inclined obliquely in relation to the stacking direction 2, and preferably between in each case two of said obliquely inclined regions 24 of the respective upper side 22, supporting surfaces 25, which project beyond said region or said obliquely inclined regions 24, and/or, on the undersides 23 of the side-wall portions 21, supporting surfaces 27, which project beyond in each case at least one adjacent region 26, preferably two adjacent regions 26, of the respective underside 23. In order to demonstrate, and further explain, preferred possible configurations in this respect, this is realized in different variants in the different exemplary embodiments of this invention. In the first exemplary embodiment according to FIGS. 1 to 19, and in the modifications according to FIGS. 20 to 22, the supporting surfaces 25 are formed exclusively on the upper sides 22 of the side-wall portions 21. The exemplary embodiment according to FIGS. 25 to 28, in contrast, shows, by way of example, a variant in which the supporting surfaces 27 are formed exclusively on the undersides 23 of the side-wall portions 21. FIGS. 29 and 30 show depictions of a combination, in which both supporting surfaces 25 are formed on the upper sides 22, and supporting surfaces 27 are formed on the respective underside 23, of the respective side-wall portion 21.

In the case of the first exemplary embodiment, reference is made, in particular, to FIGS. 4, 6 and 7. FIG. 6 shows the section taken along section line DD from FIG. 4 through the side-wall portions 21 of the boxes 1 stacked one upon the other, and therefore in a region outside the supporting surfaces 25. FIG. 7, in contrast, shows the section taken along section line EE from FIG. 4, and therefore the region in which the supporting surfaces 25 of the respectively lower box 1, said supporting surfaces being formed on the respective upper side 22 of the side-wall portion 21, support the undersides 23 of the box 1 arranged above.

This is therefore a first example of an arrangement of boxes 1 according to the invention stacked one upon the other, in the case of which provision is made for the undersides 23 of the side-wall portions 21 of the respectively upper box 1 to rest exclusively in the region of the supporting surfaces 25 on the upper sides 22 of the side-wall portions 21 of the respectively lower box 1. As is also the case here, this advantageously achieves the situation where the regions 24 of the respective upper sides 22 of the side-wall portions 21 of the lower box 1, said regions being inclined obliquely in relation to the stacking direction 2, are spaced apart from those regions of the undersides 23 of the side-wall portions 21 of the respectively upper box 1 which are arranged above them. The section illustrated in FIG. 6 shows to good effect the spaced-apart arrangement of the underside 23 of the respectively upper box 1 from the inclined region 24 of the upper side 22 of the side-wall portion 21 of the lower box 1. This results in an air gap between the respective underside 23 and the inclined region 24 of the respective upper side 22. In combination with the oblique configuration of the inclined regions 24 relative to the stacking direction 2, this achieves the situation where the upper sides 22 of the side-wall portions 21 of the respective box 1 can dry off particularly quickly and to good effect.

The term oblique should be understood, in respect of the description of the invention, as being an angle, preferably an acute angle, which is neither a right angle nor coincides with a parallel. It is preferably the case in this exemplary embodiment, as also in other exemplary embodiments according to the invention, that the regions 24 of the respective upper side 22 of the respective side-wall portion 21, said regions being inclined obliquely in relation to the stacking direction 2, enclose with the stacking direction an acute angle ranging from 5° to 15°, preferably from 7° to 10°.

FIG. 7, and therefore the section taken along section line EE from FIG. 4, shows how the supporting surfaces 25, which project beyond the obliquely inclined regions 24 on the upper side 22 of the side-wall portion 21, support, over the entire surface area, the underside 23, arranged above, of the side-wall portion 21 of the box 1 arranged above, and therefore, in the case of an appropriate number of supporting surfaces 25, the boxes can also absorb high loads.

In this configuration, as also in other preferred configurations of the invention, the supporting surfaces 25 and 27 are the only regions of the side wall 4 as a whole in which the boxes 1 stacked one above the other are supported one upon the other. This means that, in preferred configurations, the boxes 1 stacked one upon the other are not in contact in the corner regions 16, and therefore are not supported one upon the other in said corner regions 16 either.

A comparison of FIGS. 6 and 7 shows to good effect that, in preferred configurations of the invention, the supporting surfaces 25 are arranged in a first plane 28 and the respectively adjacent regions 24 of the respective upper sides 22 are arranged in a second plane 29, wherein the first plane 28 and the second plane 29 enclose an acute angle 30 with one another. In order to clarify this, the first plane 28 of the supporting surface 25 depicted in FIG. 7 is also included in FIG. 6. In this exemplary embodiment, it is also shown to good effect in FIG. 7 that in preferred variants of the invention, the supporting surfaces 25, which are formed on the upper sides 22, run in a plane 31, which is arranged normal to the stacking direction 2.

Figure 27:
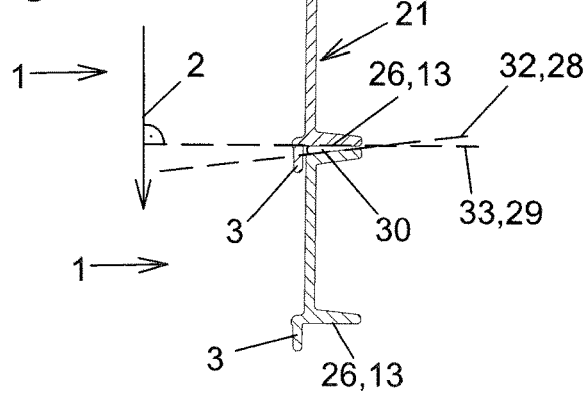
FIGS. 27 and 28 show sections through the side wall of the box according to FIGS. 25 and 26, with two such boxes stacked one upon the other.
Figure 28:
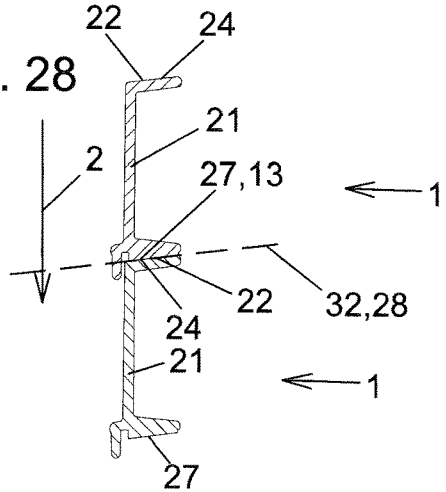

Referring now to the exemplary embodiment according to FIGS. 25 to 28, in the case of which the supporting surfaces 27 are formed exclusively on the undersides 23 of the respective side-wall portions 21, FIGS. 27 and 28 show sections analogous to FIGS. 6 and 7. FIG. 27 shows a section in a region where there is no supporting surface 27. Here too, the obliquely running regions 24 of the respective upper side 22 of the side-wall portions 21 of the respectively lower box 1 are thus spaced apart from the respective undersides 23 of the side-wall portions 21 of the box 1 stacked above. The resulting air gap, which can be seen to good effect in FIG. 27, once again helps the upper sides and undersides of the side-wall portions to dry off.

FIG. 28 shows a section through the side-wall portions 21 of the stacked boxes 1 in the region of the supporting surfaces 27, which are formed on the respective undersides 23 of the side-wall portions 21. The fact that said supporting surfaces project beyond the respectively adjacent regions 26 can be seen to good effect in FIG. 26. It is also the case in this exemplary embodiment that the supporting surfaces 27 are arranged in a first plane 28 and the respectively adjacent regions 26 of the undersides 23 of the respective underside 23 are arranged in a second plane 29, wherein the first plane 28 and the second plane 29 enclose an acute angle 30 with one another. In order to clarify this, once again the first plane 28 from FIG. 28 is also included in FIG. 27. This exemplary embodiment shows, in particular in FIG. 28, that the supporting surfaces 27, which are formed on the undersides 23, can run in a plane 32, which is arranged obliquely in relation to the stacking direction 2. As also shown in FIG. 28, said oblique progression of the supporting surfaces 27 is advantageously formed at an angle which corresponds to the obliquely running regions 26 of the respective upper sides 22 of the side-wall portions 21. As a result, the supporting surfaces 27 rest flush, and over their entire surface area, on the corresponding regions 26 of the upper sides 22 of the box 1 arranged beneath, and therefore the boxes 1 stacked one upon the other are supported in a stable manner.

This exemplary embodiment according to FIGS. 25 to 28 also shows, by way of example, that, in the case in which the supporting surfaces 27 are formed on the underside 23, said supporting surfaces projecting beyond the respectively adjacent regions 26 of the underside 23, the regions 26 of the underside 23, said regions 26 being respectively adjacent to the supporting surfaces 27, can run in a plane 33, normal to which the stacking direction 2 is arranged, see, in particular, FIG. 27.

FIGS. 29 and 30, then, show a configuration of the invention, by way of example, in which corresponding supporting surfaces 25 and 27 are formed both on the upper sides 22 and on the undersides 23. FIG. 29 shows once again, in a manner analogous to FIG. 6, the situation in a section through the side walls 21 of the stacked boxes 1 outside the regions of the supporting surfaces 25 and 27. These regions, once again, incorporate the spaced-apart arrangement and therefore the drying-assisting air gap between the undersides 23 of the respectively upper box 1 and the obliquely inclined regions 24 on the upper sides 22 of the side-wall portions 21 of the box 1 arranged beneath. The angle 30 between the first plane 28 and the second plane 29, as illustrated in FIG. 29, is the same as in the other two exemplary embodiments outlined above.

It can be seen to good effect in the section through the supporting surfaces 25 and 27 according to FIG. 30 that said surfaces rest one upon the other over their entire surface area, and therefore the boxes 1 are supported one upon the other in a stable manner. In this variant, provision is made, once again, for the supporting surfaces 25, which are formed on the upper sides 22, to run in a plane 31, which is arranged normal to the stacking direction 2. However, this exemplary embodiment also shows, by way of example, that the supporting surfaces 27, which are formed on the undersides 23, can run in a plane 31, which is arranged normal to the stacking direction 2.

The sizes of the supporting surfaces 25 and 27 and the ratio thereof to the rest of the surface areas of the upper sides 22 and undersides 23 of the side-wall portions 21 can be appropriately adjusted, in principle, in accordance with the load requirements which are to be expected and/or achieved. It is advantageous, however, if a ratio between the sum of the surface areas of all the supporting surfaces 25 on the upper sides 22 of all the side-wall portions 21 of the box 1, on the one hand, and the total surface area of the upper sides of the side wall 4 of the box 1, on the other hand, ranges from 1:5 to 1:15, preferably 1:9 to 1:11. The same applies advantageously if the supporting surfaces 27 are arranged on the undersides 23 of the side walls 4. It is then preferably the case that a ratio between the sum of the surface areas of all the supporting surfaces 27 on the undersides 23 of all the side-wall portions 21 of the box 1, on the one hand, and the total surface area of the undersides 23 of the side wall 4 of the box 1, on the other hand, ranges from 1:5 to 1:15, preferably from 1:9 to 1:11. In absolute terms, provision is advantageously made for the respective supporting surface 25 or 27 to have a surface area ranging from 75 mm$^2$ to 175 mm$^2$, preferably from 120 mm$^2$ to 135 mm$^2$.

In respect of the upper, in particular planar, boundary surface 17 of the base 3, said boundary surface bounding the accommodating space 5, provision is advantageously made for a ratio between the sum of the surface areas of all the supporting surfaces 25 and/or 27 on the upper sides 22 and/or the undersides 23 of all the side-wall portions 21 of the box 1, on the one hand, and the total surface area of the upper boundary surface 17 of the base 3 of the box 1, on the other hand, to range from 1:100 to 1:130, preferably from 1:110 to 1:115.

| Key to Reference Signs: | |
|---|---|
| 1 | Box |
| 2 | Stacking direction |
| 3 | Base |
| 4 | Side wall |
| 5 | Accommodating space |
| 6 | Gripping device |
| 7 | Longitudinal-extent direction |
| 8 | Channel |
| 9 | Entry opening |
| 10 | Exit opening |

Key to Reference Signs:

| | |
|---|---|
| 11 | Channel-boundary wall |
| 12 | Inner channel cavity |
| 13 | Section plane |
| 14 | Circumferential angle |
| 15 | Vertical extent |
| 16 | Corner region |
| 17 | Upper boundary surface |
| 18 | Undercut |
| 19 | Orienting surface |
| 20 | Catch |
| 21 | Side-wall portion |
| 22 | Upper side |
| 23 | Underside |
| 24 | Obliquely inclined region |
| 25 | Supporting surface |
| 26 | Adjacent region |
| 27 | Supporting surface |
| 28 | First plane |
| 29 | Second plane |
| 30 | Acute angle |
| 31 | Plane |
| 32 | Plane |
| 33 | Plane |
| 34 | Clearance |
| 35 | Narrowed region |

The invention claimed is:

1. A stackable box for accommodating and for transporting articles and for stacking in a stacking direction with at least one other box of a same type, the stackable box comprising:
a base,
a side wall that projects beyond the base and surrounds the base at least partially, the base and the side wall together bound an accommodating space of the box adapted for accommodating the articles, the side wall including side-wall portions that are integrally connected to adjacent ones of the side-wall portions in an upright position relative to the base by corner regions,
at least two, spaced-apart adapters in the side wall, the two, spaced-apart adapters being adapted for mechanical gripping by at least one gripping device,
the at least two, spaced-apart adapters in the side wall comprise channels which extend longitudinally in a longitudinal-extent direction that extends parallel to the stacking direction, the channels each have an entry opening, an exit opening and an inner channel cavity that extends therebetween that is bounded by a channel-boundary wall that extends longitudinally in the longitudinal-extent direction, the entry opening, the inner channel cavity and the exit opening defining a single clear open channel having a same shape in cross-section normal to a stacking direction and being configured such that the at least one gripping device having a shape coordinated with the channel is guidable through the entry opening, the inner channel cavity and the exit opening, and
wherein the channel-boundary wall of each said channel further comprises at least one undercut that is adapted to form, with the gripping device, a form fit acting in the longitudinal-extent direction of the channel, the at least one undercut is formed in a region of the exit opening of each of the channels, and a clearance is incorporated in the channel-boundary wall in a region of the entry opening of each of the channels, with the clearance creating a space in the channel-boundary wall that is configured to receive a catch of the at least one gripping device.

2. The stackable box as claimed in claim 1, wherein the channel-boundary wall is formed of a sub-region of the side wall.

3. The stackable box as claimed in claim 1, wherein, as seen in a section plane normal to the stacking direction, the channel-boundary wall bounds the inner channel cavity at least partially over a circumferential angle of at least 180°.

4. The stackable box as claimed in claim 1, wherein the side wall contains at least four channels.

5. The stackable box as claimed in claim 1, wherein, in a region of the respective channel, the side wall further includes a vertical extent in a direction parallel to the stacking direction, and the channel extends over at least 50% of said vertical extent of the side wall.

6. The stackable box as claimed in claim 1, wherein, as seen in a plan view of the box, the side wall has a rectangular base shape, and the channels are arranged in each case in corner regions of said rectangular base shape.

7. The stackable box as claimed in claim 1, wherein the base forms an upper boundary surface, by which the base bounds the accommodating space, and the stacking direction extends normal to the upper boundary surface of the base.

8. The stackable box as claimed in claim 1, wherein the box is free of wall regions which conceal the respective entry opening and the respective exit opening of the respective channel in the respective longitudinal-extent direction.

9. The stackable box as claimed in claim 1, wherein, as seen in a section plane normal to the stacking direction, the inner channel cavity of each said channel has, at least in part, a circular cross section.

10. The stackable box as claimed in claim 1, further comprising orienting surfaces located on the box, arranged such that the channels of boxes stacked one above the other are oriented in alignment relative to one another.

11. An arrangement comprising a plurality of the stackable boxes as claimed in claim 1 that are stacked one above another, wherein at least two of the channels in each of the boxes are arranged in alignment with in each case one of the channels of the box arranged respectively one of therebeneath or thereabove, such that the gripping devices is adapted to be guided therethrough.

12. A stackable box for accommodating and for transporting articles and for stacking in a stacking direction with at least one other box of a same type, the stackable box comprising:
a base,
a side wall that projects beyond the base and surrounds the base at least partially, the base and the side wall together bound an accommodating space of the box adapted for accommodating the articles,
at least two, spaced-apart adapters in the side wall, the two, spaced-apart adapters being adapted for mechanical gripping by at least one gripping device,
the at least two, spaced-apart adapters in the side wall comprise channels which extend longitudinally in a longitudinal-extent direction that extends parallel to the stacking direction, the channels each have an entry opening, an exit opening and an inner channel cavity that extends therebetween that is bounded by a channel-boundary wall that extends longitudinally in the longitudinal-extent direction and through which the at least one gripping device is adapted to be guided through the entry opening, the inner channel cavity, and the exit opening, and wherein the channel-boundary wall of each said channel further comprises at least one undercut that is adapted to form, with the gripping device, a form fit acting in the longitudinal-extent direction of the channel, and the at least one undercut is formed as a narrowed region of the inner channel cavity, and the inner channel cavity is formed by two truncated cones that meet at the narrowed region.

13. The stackable box as claimed in claim 12, wherein the channel-boundary wall is formed of a sub-region of the side wall.

14. The stackable box as claimed in claim 12, wherein, as seen in a section plane normal to the stacking direction, the channel-boundary wall bounds the inner channel cavity at least partially over a circumferential angle of at least 180°.

15. The stackable box as claimed in claim 12, wherein the side wall contains at least four channels.

16. The stackable box as claimed in claim 12, wherein, in a region of the respective channel, the side wall further includes a vertical extent in a direction parallel to the stacking direction, and the channel extends over at least 50% of said vertical extent of the side wall.

17. The stackable box as claimed in claim 12, wherein, as seen in a plan view of the box, the side wall has a rectangular base shape, and the channels are arranged in each case in corner regions of said rectangular base shape.

18. The stackable box as claimed in claim 12, wherein the base forms an upper boundary surface, by which the base bounds the accommodating space, and the stacking direction extends normal to the upper boundary surface of the base.

19. The stackable box as claimed in claim 12, wherein the box is free of wall regions which conceal the respective entry opening and the respective exit opening of the respective channel in the respective longitudinal-extent direction.

20. The stackable box as claimed in claim 12, wherein, as seen in a section plane normal to the stacking direction, the inner channel cavity of each said channel has, at least in part, a circular cross section.

21. The stackable box as claimed in claim 12, further comprising orienting surfaces located on the box, arranged such that the channels of boxes stacked one above the other are oriented in alignment relative to one another.

22. An arrangement comprising a plurality of the stackable boxes as claimed in claim 15 that are stacked one above another, wherein at least two of the channels in each of the boxes are arranged in alignment with in each case one of the channels of the box arranged respectively one of therebeneath or thereabove, such that the gripping devices is adapted to be guided therethrough.

* * * * *